United States Patent
Browna

(10) Patent No.: US 7,698,181 B2
(45) Date of Patent: Apr. 13, 2010

(54) METHOD AND APPARATUS FOR CUSTOM COST ACCOUNTING INVOICING

(75) Inventor: Michael Patrick Browna, Sinking Spring, PA (US)

(73) Assignee: Penske Truck Leasing Co., LP, Reading, PA (US)

( * ) Notice: Subject to any disclaimer, the term of this patent is extended or adjusted under 35 U.S.C. 154(b) by 0 days.

(21) Appl. No.: 12/008,211

(22) Filed: Jan. 9, 2008

(65) Prior Publication Data
US 2009/0177566 A1 Jul. 9, 2009

(51) Int. Cl.
G07B 17/00 (2006.01)
G07F 19/00 (2006.01)
H04M 15/00 (2006.01)

(52) U.S. Cl. .......................... 705/30; 705/34
(58) Field of Classification Search ............. 705/30
See application file for complete search history.

(56) References Cited

U.S. PATENT DOCUMENTS

| | | | |
|---|---|---|---|
| 5,956,690 A * | 9/1999 | Haggerson et al. ............ 705/3 |
| 5,963,925 A * | 10/1999 | Kolling et al. ............... 705/40 |
| 6,070,155 A * | 5/2000 | Cherrington et al. ........ 705/400 |
| 6,208,345 B1 | 3/2001 | Sheard et al. |
| 6,356,880 B1 * | 3/2002 | Goossens et al. ............. 705/30 |
| 7,089,533 B2 * | 8/2006 | Vosburgh .................... 717/123 |
| 7,093,195 B2 * | 8/2006 | Lynch et al. ................ 715/221 |
| 7,100,195 B1 * | 8/2006 | Underwood .................. 726/2 |
| 7,302,431 B1 * | 11/2007 | Apollonsky et al. .......... 707/10 |
| 7,392,309 B2 * | 6/2008 | Childers et al. ............. 709/224 |
| 2002/0091597 A1 * | 7/2002 | Teng ........................... 705/30 |
| 2004/0153404 A1 * | 8/2004 | Rischmueller et al. ........ 705/40 |
| 2005/0021426 A1 * | 1/2005 | Leroux et al. ................ 705/29 |
| 2005/0050311 A1 * | 3/2005 | Joseph et al. ................. 713/1 |
| 2005/0165681 A1 * | 7/2005 | Heinemann et al. .......... 705/40 |
| 2005/0198074 A1 * | 9/2005 | Khayter et al. ........... 707/104.1 |
| 2005/0278232 A1 * | 12/2005 | Bruffey et al. ............... 705/30 |
| 2006/0085302 A1 * | 4/2006 | Weiss et al. ................. 705/30 |
| 2006/0271397 A1 * | 11/2006 | Allin et al. .................. 705/1 |
| 2007/0061260 A1 * | 3/2007 | deGroeve et al. ............ 705/44 |
| 2007/0089117 A1 * | 4/2007 | Samson .................... 719/330 |
| 2007/0112650 A1 * | 5/2007 | Klehr et al. ................. 705/28 |
| 2007/0261026 A1 * | 11/2007 | Berger et al. ............... 717/109 |
| 2007/0271160 A1 * | 11/2007 | Stone et al. ................. 705/30 |
| 2007/0288333 A1 * | 12/2007 | Blasnik et al. .............. 705/30 |
| 2008/0177643 A1 * | 7/2008 | Matthews et al. ............ 705/30 |
| 2008/0243723 A1 * | 10/2008 | Voorhees .................... 705/400 |

OTHER PUBLICATIONS

Anatomy of a plan: Better practices dfor management, Jeff Thomson, Strategic Finance, Oct. 2007, vol. 89, Issue 4,pp. 20.*
Family dollar selects, Business wire, Apr. 3, 2006.*
Penske Truck lesing selects, PR newswire, Feb. 14, 2006, p. 1.*
Ryder System launches Analysis5, M2 Presswire, Jun. 11, 2007, p. 1.*

* cited by examiner

*Primary Examiner*—Matthew S Gart
*Assistant Examiner*—Harshad Parikh
(74) *Attorney, Agent, or Firm*—Drinker Biddle & Reath LLP

(57) ABSTRACT

A method and apparatus for providing custom cost accounting invoicing. The method allows each customer to associate its proprietary accounting information and billing system with invoicing information. The method provides each customer with the ability to create various expense and other information profiles, such that custom invoices may be generated using the information provided in the profiles.

20 Claims, 12 Drawing Sheets

1100

Accounts Payable Transmittal

Truck Leasing

Page: 5 of 9
Number: A999 9999 99
Date: September 1, 2005
Customer: 60222100-6218
Servicing Location: Romeroville 999-999-9999

—1105  —1180  —1110  —1185  —1115  —1190

Vendor Number - A0987654:    Profit Center - 5650:    Department Name - Transportation:

| Division Number | Oracle Number | Store Number | Charge Type | GL Number | Amount ($) |
|---|---|---|---|---|---|
| 1120 | 1130 | 1140 | 1150 | 1160 | 1170 |
| 2323 | 876-89765DL | 135 | CM Peg | 1112 | $ 12,986.54 |
| 1125 2323  1135 | 876-89765DL | 1145 135 | 1155 Extra | 1165 1113  1175 | $ 11,666.01 |
| 2323 | 876-89765DL | 135 | Sub | 1114 | $ 8,555.55 |
| 2323 | 876-89765DL | 135 | CM | 1115 | $ 5.678.99 |
| 2329 | 876-89769DL | 99 | Special | 1112 | $ 13,333.33 |
| Etc... | Etc... | Etc... | Etc... | Etc... | Etc... |

Total: $ 52,220.42

Accounts Payable Transmittal 1100

Truck Leasing

Page: 5 of 9
Number: A999 9999 99
Date: September 1, 2005
Customer: 60222100-6218
Servicing Location: Romeroville
999-999-9999
—1190

Vendor Number - A0987654: —1105 —1180

Profit Center - 5650: —1110 —1185

Department Name - Transportation: —1115

| Division Number 1120 | Oracle Number 1130 | Store Number 1140 | Charge Type 1150 | GL Number 1160 | Amount ($) 1170 |
|---|---|---|---|---|---|
| 2323 | 876-89765DL | 135 | CM Peg | 1112 | $ 12,986.54 |
| 1125 { 2323 1135 | 876-89765DL | 1145 { 135 | 1155 { Extra | 1165 { 1113 1175 { | $ 11,666.01 |
| 2323 | 876-89765DL | 135 | Sub | 1114 | $ 8,555.55 |
| 2323 | 876-89765DL | 135 | CM | 1115 | $ 5,678.99 |
| 2329 | 876-89769DL | 99 | Special | 1112 | $ 13,333.33 |
| Etc... | Etc... | Etc... | Etc... | Etc... | Etc... |

Total: $ 52,220.42

Individual Invoice View/Edit screen

1200

Truck Leasing

Page: 5 of 9
Number: A999 9999 99
Date: September 1, 2005
Customer: 60222100-6218
Servicing Location: Romeroville
999-999-9999

Lease charges

| Penske unit # Customer # | Variable Miles/Hours | Beginning | Ending | Total | Rate | Variable charge | Fixed charge | Additional vehicle adjustment | Tax | Total charge |
|---|---|---|---|---|---|---|---|---|---|---|
| 271254 | Miles | 999,167,442 | 999,167,442 | 999,999,024 | $.0933 | $99,999,282.14 | $99,991,469.52 | | $999,122.62 | $593 |
| | | | | | | GL Data | GL Data | | GL Data | GL Data |
| | | | | | | 1205 | 1210 | | 1215 | 1220 |

METHOD AND APPARATUS FOR CUSTOM COST ACCOUNTING INVOICING

BACKGROUND OF THE INVENTION

This invention relates to a method and apparatus for providing custom cost accounting billing and invoicing to facilitate business transactions.

Many business transactions require the steps of billing and invoicing. For example, in a typical business transaction, a seller of products and/or services sends an invoice to the purchaser of the products and/or services. The purchaser receives the invoice, charges or bills the amount to the appropriate account or accounts, and pays the amount on the invoice to complete the business transaction. Very often, both the seller and the purchaser are large business entities that involve multiple branches, employees, departments and business accounts. Thus, to aid the processing of business transactions, many of these billing and invoicing are performed electronically with various software and computer systems.

Even with sophisticated billing and accounting systems, the billing and invoicing involved in transactions is still complex. For example, multiple services and/or products may be involved in the same transaction, and one business entity may be involved in numerous transactions at the same time. Different types of transactions, services, or products may be charged to various different accounts or deducted from different budgets. In addition, the party receiving the invoice may also need to associate various other proprietary information to the items in the invoice, since such information may be important and essential for the invoice receiving party to complete the business transaction. For example, the party receiving the invoice may want to associate information regarding departments, managers, divisions, budgets or events with each item in the invoice.

Because of the complexity of both the transactions and the billing and accounting systems, a party receiving invoices must often further process the data in the invoices before appropriate accounts can be charged and the invoices can be paid. Typically, after a party receives an invoice, the party must first go through each item of the invoice and determine which account should be associated with a particular item in the invoice. Because each party has its custom proprietary computer systems, the party receiving the invoice must specify the account information in its own computer systems before the invoice can be processed. This may typically involve the party manually entering the invoice data into its system and associating specific items on the invoice with specific accounts. This additional processing significantly increases the workload and time required to process each invoice, and hence detrimentally affects the efficiency of business transactions, especially for large transactions and/or recurring transactions.

Therefore, there is a need to allow an invoice receiving party to customize the invoicing process such that the necessary proprietary information associated with an invoice is available automatically without the need for any of the above additional processing.

BRIEF DESCRIPTION OF THE INVENTION

The present invention provides a method and apparatus for custom cost accounting invoicing. Such custom cost accounting invoicing allow each customer to associate its proprietary information with the invoicing information such that invoices can be processed much more efficiently, allowing business transactions to be completed much more smoothly and promptly.

The present invention allows a user to configure and associate different account information with different items in an invoice. Each of these account configurations and associations are stored as expense profiles and invoices may be generated both electronically or on paper with the account associations embedded within. Multiple profiles can be created to better facilitate the needs of the customer. The present invention also provides the customer with the ability to associate stored expense profiles with items in an invoice.

In addition, the present invention provides a customer with the ability to define custom information relating to various items in an invoice. Depending on the type of business transactions, custom information may be different. For example, in a truck rental business, it would be desirable to associate location and truck units information with custom proprietary information in an invoice. Thus, the present invention allows users to set up custom information profiles such as location/unit profiles that associate custom fields and custom field values according to vendors, locations and units; hence allowing the user to tailor the invoice according to its proprietary billing systems.

Furthermore, the present invention provides a customer with the ability to more easily and efficiently perform analysis on invoicing or accounting information and prepare custom reports. Because the customer's proprietary information is already associated with the invoicing or accounting information, a customer can perform custom analysis that takes into account the customer's proprietary information. This enhances reporting performance and improve the accuracy, efficiency, and quality of analytics that would be performed on the data. The present invention provides the customer a highly flexible way to produce reports, making reports much more useful to the customer.

BRIEF DESCRIPTION OF THE DRAWINGS

The method and apparatus for custom cost accounting invoicing are further described with reference to the accompanying drawings in which:

FIG. 5 is an exemplary screen for creating an expense profile of an illustrative operation in accordance with the herein described methods.

FIG. 6 is an exemplary screen for editing an expense profile of an illustrative operation in accordance with the herein described methods.

DETAILED DESCRIPTION OF THE INVENTION

Figure 1:
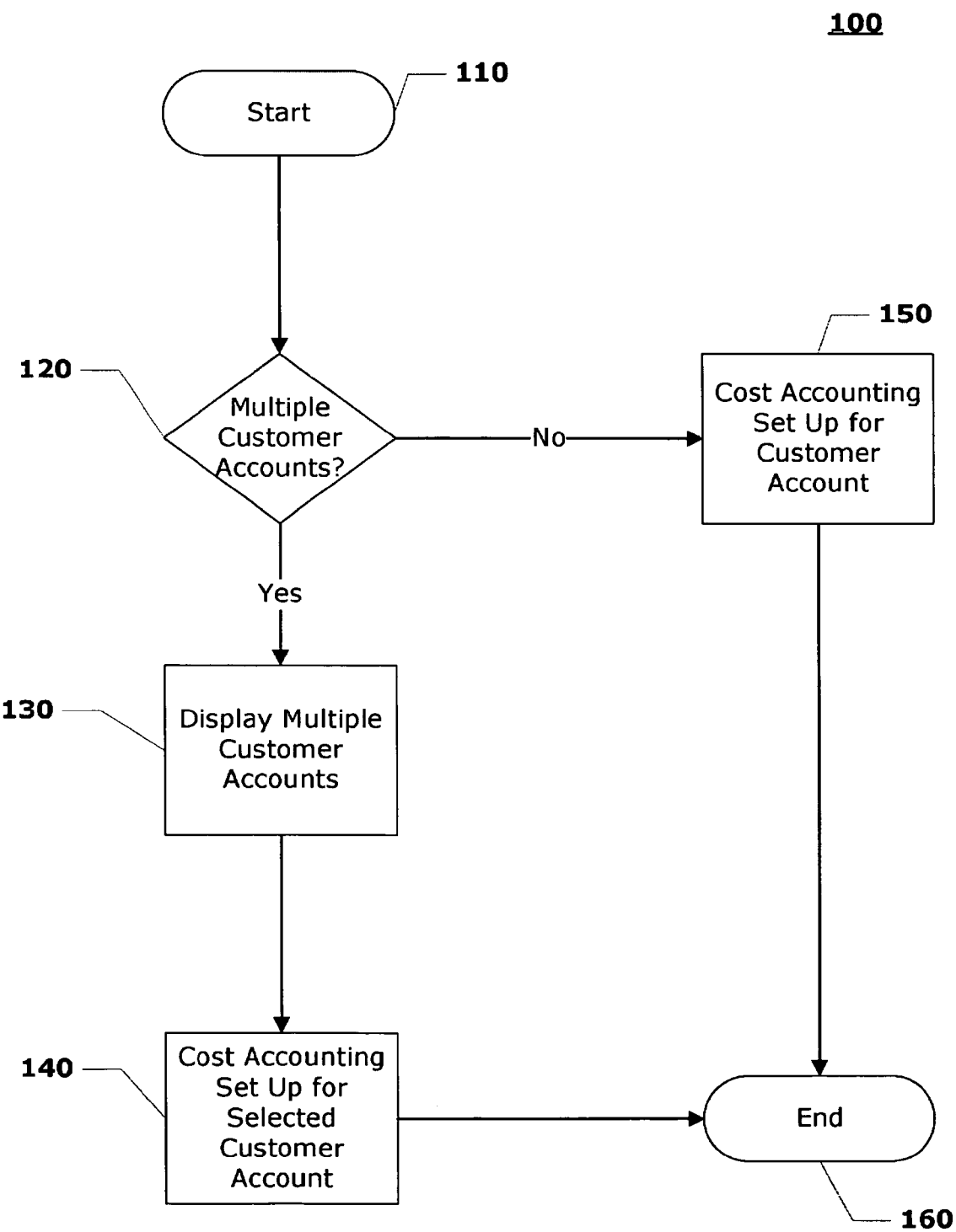
FIG. 1 is a flow diagram of the processing performed in an illustrative operation in accordance with the herein described methods.

The present invention provides a method and apparatus for custom cost accounting invoicing that would allow a user to associate items on an invoice to its custom proprietary billing system.

In one aspect, a computer program may be written for custom cost accounting invoicing using the method of the present invention. This program can be loaded into the memory of a computer system (such as a customer's computer system) having an interface for receiving user input such as custom cost accounting data (e.g., an expense profile or custom profile), a processor for running the computer program, and a transmitter for transmitting the custom cost accounting data over a network to another location after the custom cost accounting data has been collected. The transmitter can be a wired transmitter for transmitting the custom cost accounting data over wired networks, or a wireless transmitter for transmitting the custom cost accounting data over wireless networks. A second computer system (such as a vendor's computer system) with memory, a processor, a receiver and an output device can receive the custom cost accounting data into its memory, then process the custom cost accounting data it receives to generate custom invoices onto the output device. The output device can be a transmitter for transmitting the custom invoices, or the output device can be a display or printing device for displaying and/or printing the custom invoices. The output transmitter can be a wired transmitter for transmitting over wired networks, or a wireless transmitter for transmitting over wireless networks.

In another aspect, the invention can be practiced using an internet application where the input interface may be provided as one or more internet pages. A web application may be provided to the customer as the input interface for inputting custom cost accounting data. The custom cost accounting data is then collected from the web application and stored in a database on a server (such as a vendor's server). The server can then process the custom cost accounting data to generate custom invoices. The generated custom invoices can be displayed as one or more web pages to the user, which the user may choose to electronically store or physically print. Alternatively, the custom invoice data may be made available to the user via the web interface so that the user may directly input the data into the user's database or accounting software.

In a further aspect, the invention can be practiced using batch mode. After a server collects the custom cost accounting data, the server can then process the cost accounting data using the custom cost accounting data (e.g., expense profiles) and transmit the processed data to a recipient server. The recipient server receives the data, which allows the recipient to further process the data according to its needs. For example, the recipient server may belong to the customer, and the recipient server may further process the data to generate invoices, input data into the recipient's server's database, perform analysis, or perform other useful functions. This allows the data to be processed and transmitted in batch mode, i.e. a large amount of data may be communicated between servers at the same time. When the recipient server receives the data, the recipient server can process large amounts of data at the same time. This not only greatly improves the efficiency and accuracy of the process, but also allows the customer to perform customary or other statistical analysis on the data.

In one aspect, the computer program performs a check to determine whether a particular user has multiple customer accounts. If it is determined that the particular user has multiple customer accounts, the computer program would display the multiple customer accounts and allow the user to select a customer account. After the user selects a customer account, the program proceeds to the cost accounting set up process. This aspect of the present invention may follow the flow chart of FIG. 1.

As shown in FIG. 1, processing begins at block 110 and proceeds to block 120, where a check is performed to determined whether multiple customer accounts exist for a particular user. If the check at block 120 indicates that multiple customer accounts exist for the user, processing proceeds to block 130, where the different customer accounts are displayed as a selection for the user. For example, if the user has three customer accounts, then the process at block 130 would display the names, descriptions and customer account numbers for the three customer accounts and request a selection from the user. After the user selects a customer account, processing proceeds to block 140, where the cost accounting set up process can be performed for the selected customer account. In contrast, if the check at block 120 indicates that no multiple customer accounts exists for the user, i.e. the user only has one single customer account, processing then proceeds to block 150, where the cost accounting set up process can be performed for the single customer account.

Figure 2:
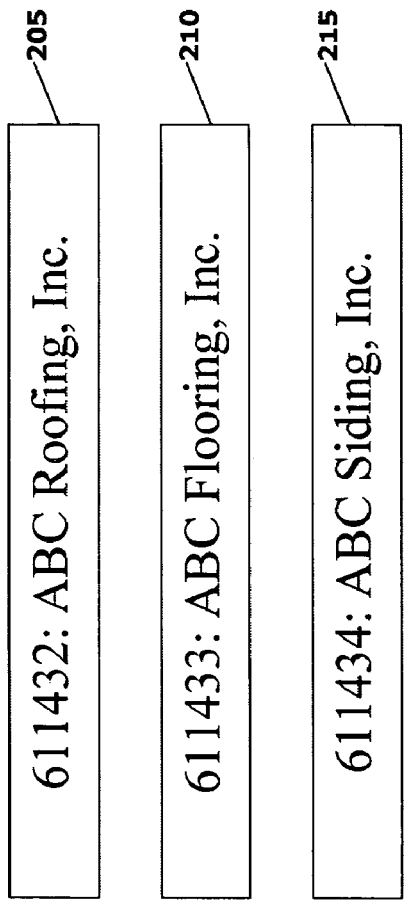
FIG. 2 is an exemplary screen for customer account selection in accordance with the herein described methods.

The process of displaying a selection of multiple customer accounts can be illustrated by FIG. 2. FIG. 2 is an exemplary screen for customer account selection when the user has multiple customer accounts. In this example, the user has three customer accounts: customer account number "611432" for "ABC Roofing, Inc.", customer account number "611433" for "ABC Flooring, Inc.", and customer account number "611434" for "ABC Siding, Inc." As shown in FIG. 2, information such as customer account numbers and descriptions regarding the three customer accounts are displayed in 205, 210, and 215. The user can now select the desired customer account to start the cost accounting set up process for the selected customer account.

Figure 3:
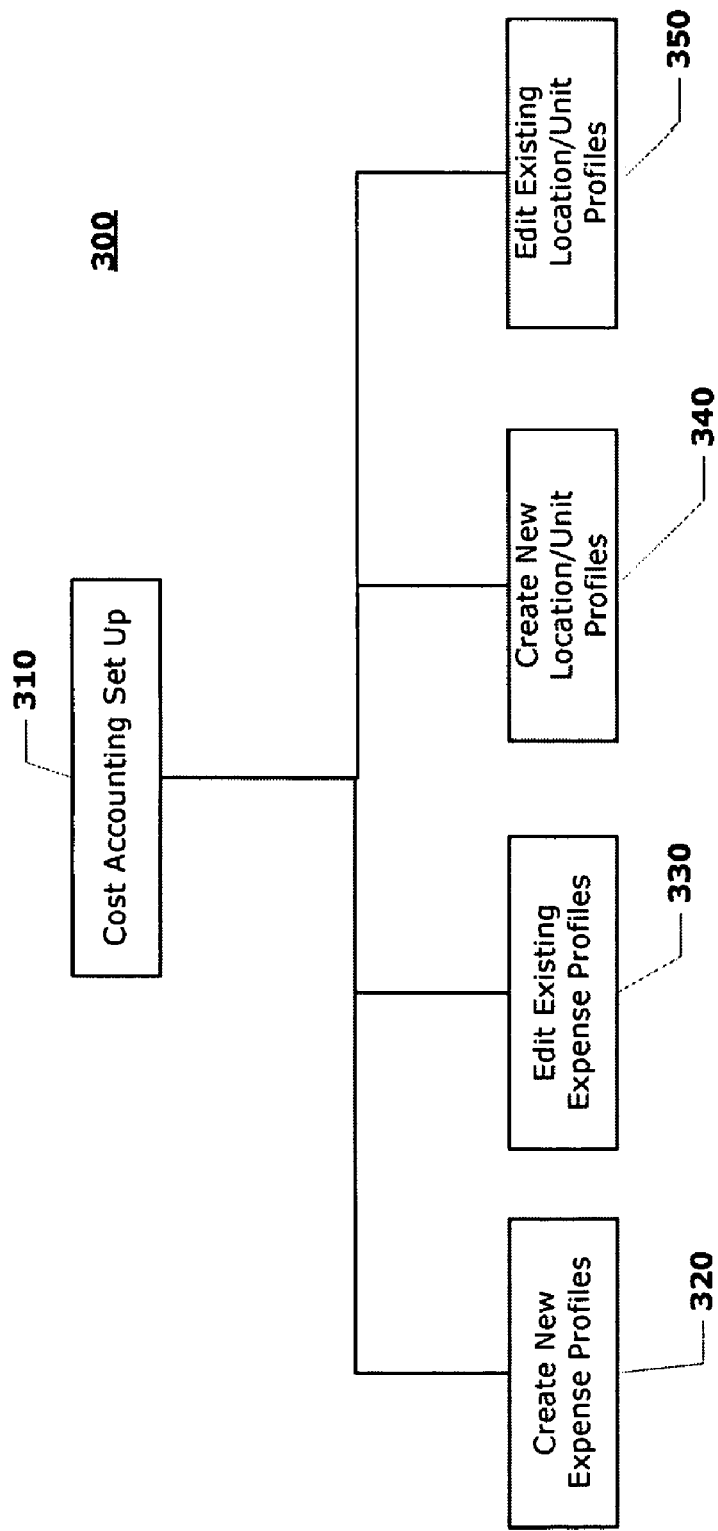
FIG. 3 is a block diagram showing exemplary functionalities of an illustrative operation in accordance with the herein described methods.

In one example of the cost accounting set up process, shown in FIG. 3, four functionalities are available: i) create new expense profiles at block 320; ii) edit existing expense profiles at block 330; iii) create new location/unit profiles at block 340; and iv) edit existing location/unit profiles at block 350. The functionalities may be presented to the user such that the user may select the desired functionality to proceed with.

Under the create new expense profiles functionality, a user can create one or more expense profiles, where each expense profile holds various account information and associations between various account information and invoice items. After the expense profiles are created, they are stored and new invoices may be generated using the information contained in the expense profiles. Under the edit existing expense profiles functionality, the user can edit one or more expense profiles that have been created previously. The user can change existing accounting information, change existing account associations, delete existing accounting information, delete existing account associations, create new accounting information, and create new account associations. After the changes are made, the existing expense profiles are updated and new custom invoices may be generated using the updated expense profiles.

Under the create new location/unit profiles functionality, a user can create one or more custom profiles. In the present example the custom profiles are location/unit profiles, however a user may define any type of custom profile that is useful for its billing system. Each location/unit profile holds various custom defined fields, custom defined field values and different associations between one or more expense profiles with various fields in the location/unit profile. After the location/unit profiles are created and stored, custom invoices may be generated using the information contained in the location/unit profiles. Under the edit existing location/unit profiles functionality, the user can edit one or more location/unit profiles that have been created previously. The user can change existing custom field names, change existing custom field values, change existing expense profile associations, delete existing custom field names, delete existing custom field values, delete existing expense profile associations, create new custom fields, create new custom field values, and create new expense profile associations. After the changes are made, the existing location/unit profiles are updated and new custom invoices may be generated using the updated location/unit profiles.

More particularly with regard to the expense profile, in one aspect an expense profile contains information regarding expenses, invoice items, and account information. Each expense profile comprises one or more aggregate expense items. Each aggregate expense item may have one or more expense service items and/or one or more expense attribute items. In other words, each aggregate expense item may include only expense service items, only expense attribute items; or, as an alternative, one or more expense service items and one or more expense attribute items. At the same time, an aggregate expense item may stand alone without any expense service items or expense attribute items. Accordingly, each expense service item may include one or more expense attribute items; or, as an alternative, an expense service item may stand alone without any expense attribute items.

For example, a sample expense profile may comprise a aggregate expense item "lease." Under the "lease" aggregate expense, there may be several expense service items, such as "FSL," "CM Peg," and "Extra." Under the "FSL" expense service item, there may be several expense attribute items, such as "Fixed," "Mileage," "Reefer Hours," and "Tax."

Figure 4:
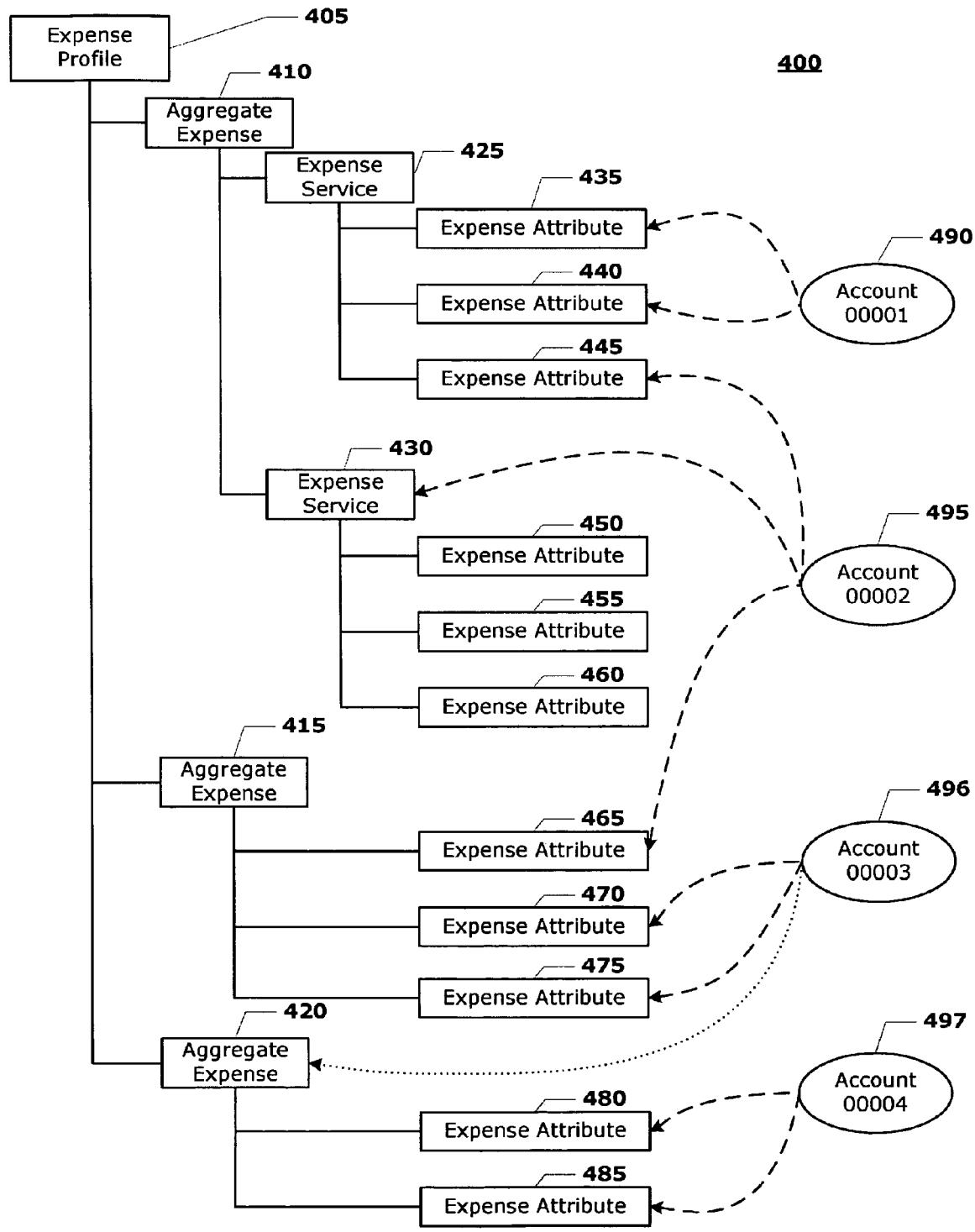
FIG. 4 is a block diagram showing an exemplary expense profile of an illustrative operation in accordance with the herein described methods.

An exemplary expense profile may be further illustrated according to the block diagram as shown in FIG. 4. As shown in FIG. 4, an expense profile 405 may include aggregate expense items 410, 415, and 420. Under aggregate expense item 410, there may be expense service items 425 and 430. According to FIG. 4, there may be expense attribute items 435, 440, and 445 under expense service item 425; and there may be expense attribute items 450, 455 and 460 under expense service item 430. In addition, there may be expense attribute items 465, 470, and 475 directly under aggregate expense item 415; and there may be expense attribute items 480, and 485 under aggregate expense item 420.

In one aspect of the exemplary expense profile, the user may associate account information at any level of the expense profile, such as the aggregate expense level, the expense service level, and/or the expense attribute level. In other words, the user may choose to associate account information with an aggregate expense item; or the user may choose to associate account information with one or more expense service items and/or expense attribute items.

To better serve business needs, the account information association may follow certain business rules. For instance, if account information is associated with a higher level expense item but no account information is associated with the underlying lower level expense item, then it is assumed that the same account information is associated all lower level expense items under that higher level expense item. For example, if account information is associated with an aggregate expense item, but no account information is associated with any of the expense service items and/or expense attribute items under that aggregate expense item, it would be assumed that the same account information associated with the aggregate expense item is also associated with all the expense service items and/or expense attribute items under that aggregate expense item.

On the other hand, if there are account information associated with multiple levels of expense items within a higher level expense item, the account information association would be prioritized from the lowest level. That is, an account information association at the lower level would override an account information association at a higher level. For example, an expense profile may include one aggregate expense level; multiple expense service level within the aggregate expense level; and multiple expense attribute levels within each expense service level. If there are account information associated with all three levels (aggregate expense level, expense service levels and expense attribute levels), then the account information association would be prioritized from the expense attribute levels. In other words, the account information association at the expense attribute levels would override the account information associations at the expense service levels and the aggregate expense level.

For example, a sample expense profile may comprise an aggregate expense item "lease." Under the "lease" aggregate expense, there may be several expense service items, such as "FSL," "CM Peg," and "Extra." Under the "FSL" expense service item, there may be several expense attribute items, such as "Fixed," "Mileage," "Reefer Hours," and "Tax." The user may define associations such that account 1 is associated with the aggregate expense item "lease;" account 2 is associated with the expense service item "FSL," "CM Peg;" account 3 is associated with the expense service item "Extra," the expense attribute items "Fixed," and "Mileage;" and account 4 is associated with the expense attribute items "Reefer Hours," and "Tax." Because there are account information associated with different three levels of expenses, the account information association would be prioritized from the lowest level, i.e. the expense attribute level. Thus, the association of account 4 with expense attribute level items "Reefer Hours," and "Tax" would override the association of account 2 with expense service level item "FSL" and the association of account 1 with aggregate expense level item "lease." Similarly, the association of account 3 with expense attribute level items "Fixed," and "Mileage" would override the association of account 2 with expense service level item "FSL" and the association of account 1 with aggregate expense level item "lease."

FIG. 4 shows exemplary account information associations. As shown in FIG. 4, Account 00001 of block 490 may be associated with expense attribute items 435 and 440, while Account 00002 at block 495 may be associated with another expense attribute 445 under the same tree of expense service 425. At the same time, Account 00002 at block 495 may be associated with expense service 430 and expense attribute 465, where expense attribute 465 is under a completely different aggregate expense 415. As further illustrated by FIG. 4, Account 00003 at block 496 may be associated with expense attributes 470 and 475 under the aggregate expense 415. At the same time, Account 00003 at block 496 may be associated with aggregate expense 420. Similarly, Account 00004 at block 497 may be associated with expense attributes 480 and 485.

Because Account 00002 at block 495 is associated with expense service 430, and no other account information is associated with the expense attributes 450, 455 and 460, it is assumed that Account 00002 is also associated with the expense attributes 450, 455, and 460, which are all under the same expense service tree 430.

As shown in FIG. 4, Account 00003 at block 496 is associated with the higher level aggregate expense 420 while Account 00004 at block 497 is associated with the underlying lower level expense attributes 480 and 485. Therefore, the account association would be prioritized from the lower expense attribute level. In other words, the association of Account 00004 at block 497 with expense attributes 480 and 485 would be given priority and would override the association of Account 00003 at block 496 with aggregate expense 420.

Figure 5:
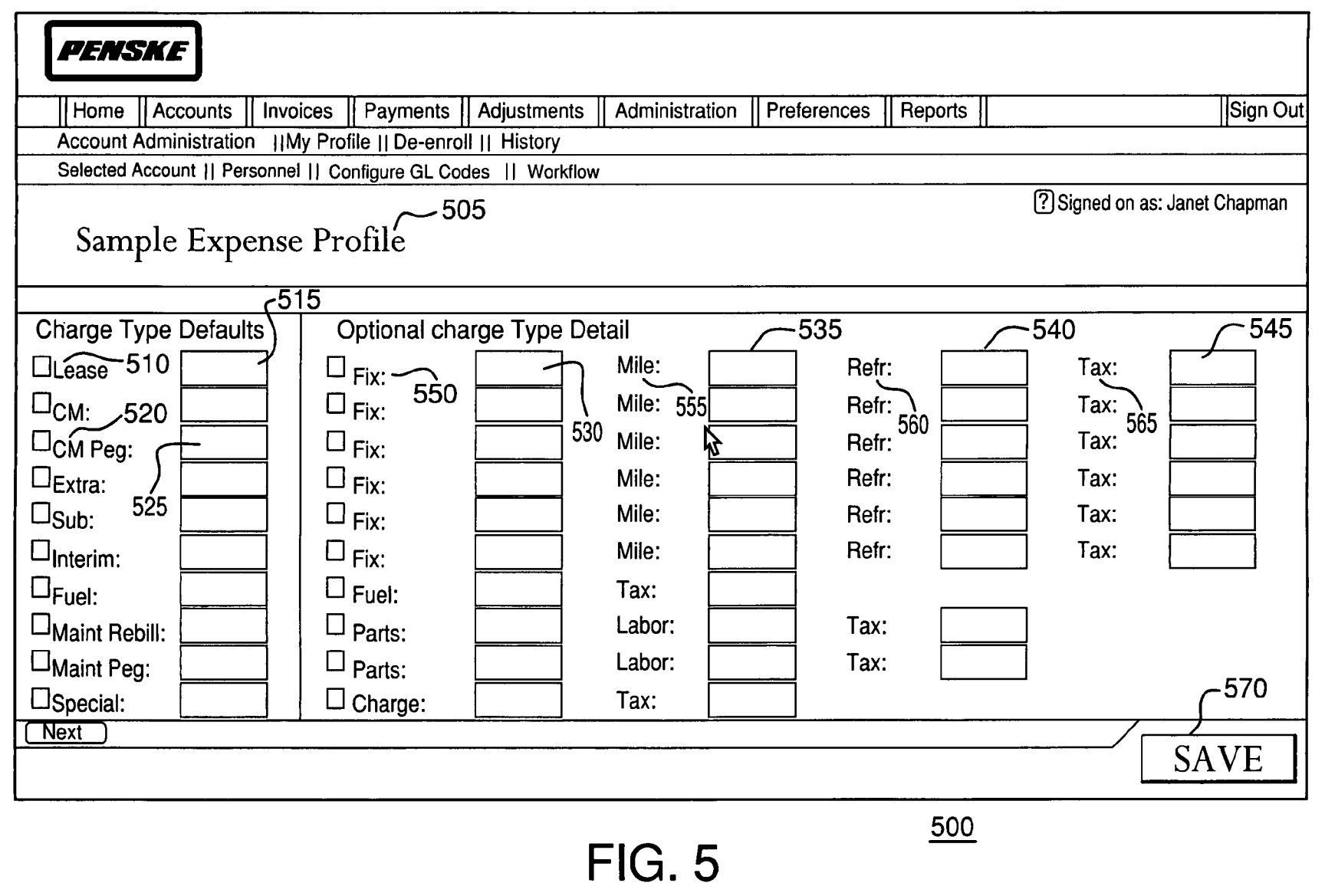

An exemplary expense profile and account information associations may be further illustrated by the screen shot in FIG. 5. FIG. 5 shows an exemplary screen where the user may create a new expense profile. As shown in FIG. 5, the name of the expense profile is shown in block 505, where the user may provide a custom name for the expense profile. In this example, the expense profile includes an aggregate expense "Lease" 510, and several expense services such as "CM Peg" 520. The user can input account information in block 515 to associate account information with the aggregate expense "Lease" 510, and the user can input account information in block 525 to associate account information with the expense service "CM Peg" 520. In addition, there are expense attributes "Fix" 550, "Mile" 555, "Refr" 560 and "Tax" 565, where the user can associate account information by inputting the respective account information in blocks 530, 535, 540 and 545. After the user has completed the account information associations, the user can use the "Save" feature at block 570 to store the expense profile. After an expense profile is stored, new invoices may be generated using the stored expense profile. In addition, a stored expense profile may be associated with one or more location/unit profiles.

Figure 6:
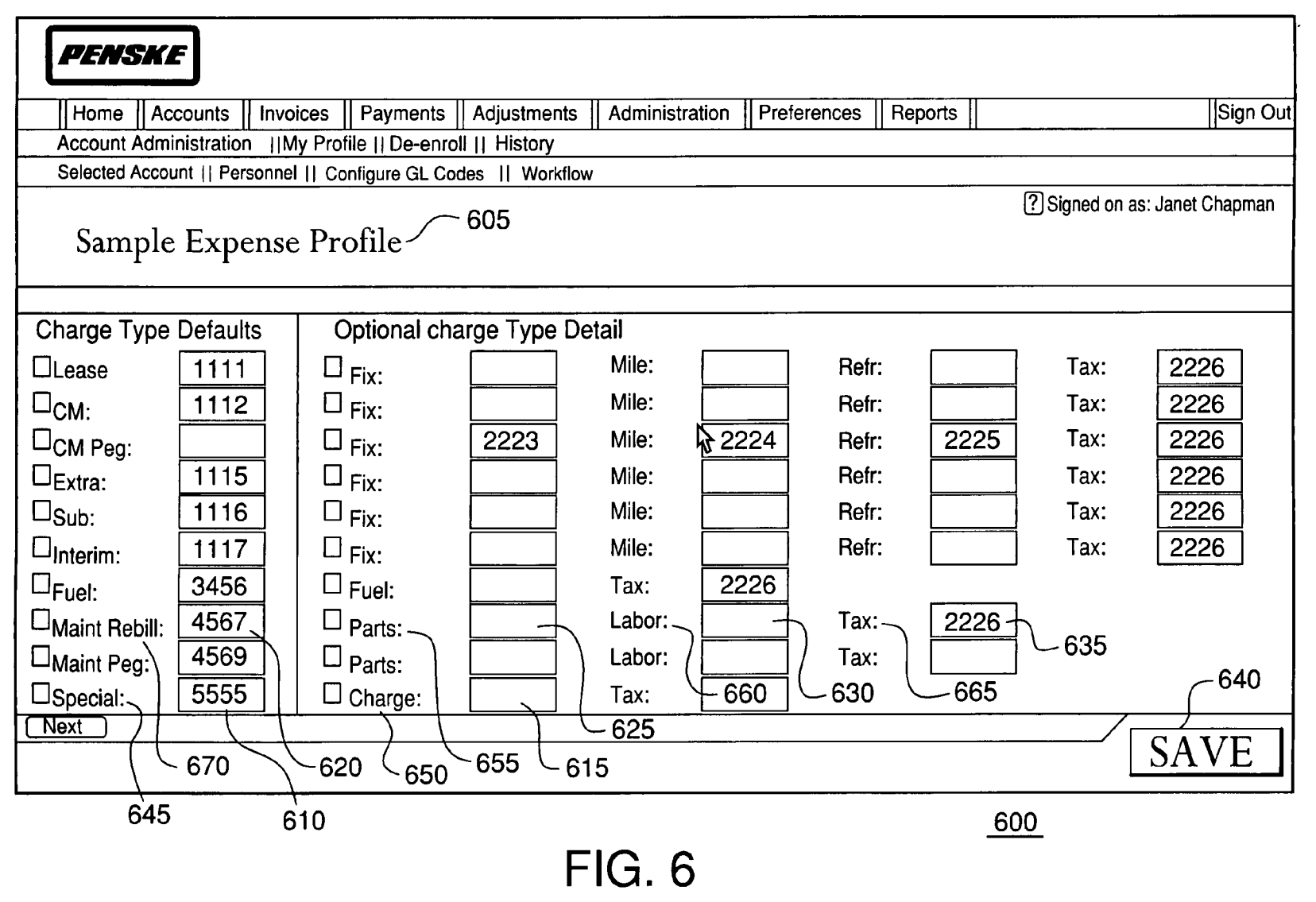

An exemplary expense profile and account information associations may be further illustrated by the screen shot in FIG. 6. FIG. 6 shows an exemplary screen where the user may edit an existing expense profile. As shown in FIG. 6, the name of the existing expense profile is shown in block 605, where the user may edit or change the name for the existing expense profile. In this example, the user may edit, change or delete the association of account "5555" at block 610 with expense service "Special" 645. In addition, the user may create new association of account information at block 615 with expense service "Charge" 650. As previously discussed, when account associations are provided for multiple expense levels within the same aggregate expense tree, priority would be given to the lowest expense level. On the other hand, if account information associations are provided for the higher expense level, but no account information associations are provided for the underlying lower expense levels, it would be assumed that the same account information are associated with the underlying lower expense levels. For example, as shown in FIG. 6, account information association "4567" is provided at block 620 for the expense service "Maint Rebill" 670, and account information association "2226" is provided at block 635 for the expense attribute "Tax" 665, but no account information association is provided at block 625 and block 630 for expense attribute "Parts" 655 and expense attribute "Labor" 660. In this case, priority would be provided to the account information association of "2226" at block 635 with the expense attribute "Tax" 665, such that the account information association of "2226" at block 635 would override the account information association of "4567" at block 620 with the higher level expense service "Maint Rebill" 670. On the other hand, since no account information associations are provided at block 625 and block 630 for the expense attributes "Parts" 655 and "Labor" 660, but account information association "4567" is provided at block 620 for the higher level expense service "Maint Rebill" 670, it is assumed that the account information association "4567" provided at block 620 would also be the account association for expense attributes "Parts" 655 and "Labor" 660. After the editing of the existing expense profile is completed, the user may use the "Save" functionality at block 640 to update and store the expense profile. After the expense profile is updated, new invoices may be generated using the updated expense profile.

In another aspect of the present invention, a custom profile such as a location/unit profile may contain information regarding vendors, locations, units, custom fields and custom field values. Each location/unit profile comprises one or more vendors. Each vendor may have one or more locations and/or one or more units. In other words, each vendor may include locations only, units only; or, as an alternative, one or more locations and one or more units. At the same time, a vendor may stand alone without any locations or units. In addition, each location may include one or more units, or, as an alternative, a location may stand alone without any units.

A number of custom fields can be defined at any level of a location/unit profile. That is, a number of vendor custom fields may be defined at the vendor level, a number of location custom fields at the location level, or a number of unit custom fields at the unit level may be defined. Moreover, each custom field may have one or more custom field values defined. The custom field feature allows the user to define and associate respective custom information with various items in an invoice. For example, a user may associate branch and department information with various charges in an invoice. In addition to custom fields, expense profiles may also be associated with a location/unit profile at any level; for instance, the vendor level, the location level, or the unit level.

Figure 7:
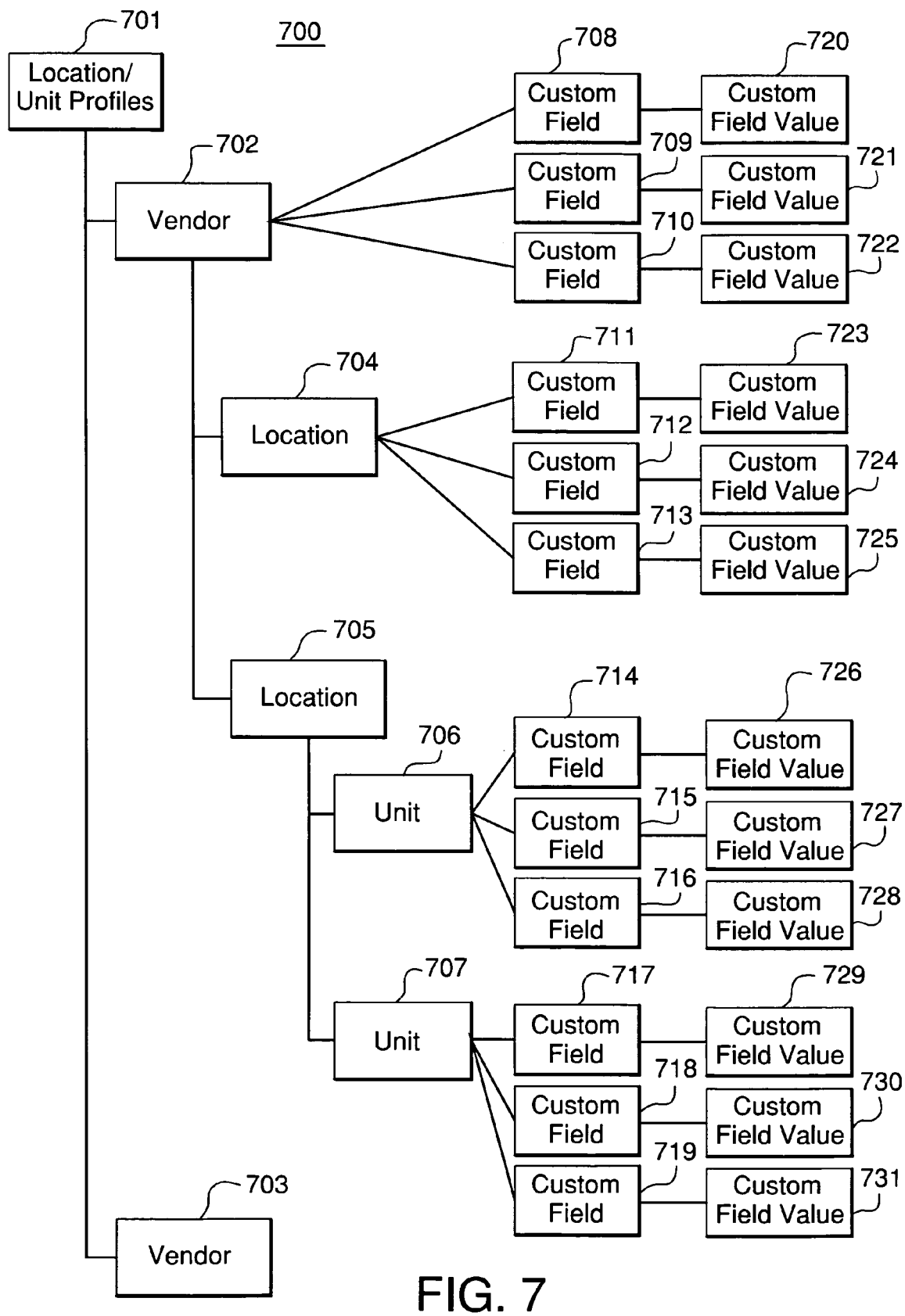
FIG. 7 is a block diagram showing an exemplary location/unit profile of an illustrative operation in accordance with the herein described methods.

An exemplary location/unit profile may be further illustrated according to the block diagram shown in FIG. 7. As shown in FIG. 7, a location/unit profile 701 may include vendors 702 and 703. Under the vendor 702, there may be locations 704 and 705. According to FIG. 7, there may be units 706 and 707 under location 705.

As shown in FIG. 7, multiple custom fields may be defined and associated with a location/unit profile at any level. Custom fields 708, 709 and 710 may be associated with vendor 702. Custom field values 720, 721, and 722 may be associated with custom fields 708, 709 and 710 respectively. Similarly, custom fields 711, 712, 713 and their respective custom field values 723, 724, 725 may be associated with location 704. Furthermore, custom fields 714, 715, 716 and their respective custom field values 726, 727, 728 may be associated with unit 706. Similarly, custom fields 717, 718, 719 and their respective custom field values 729, 730, 731 may be associated with unit 707.

As discussed, in addition to custom field and custom field values, expense profiles may be defined and associated with a custom profile such as a location/unit profile at any levels. This may be further illustrated by the block diagram in FIG.

Figure 8:
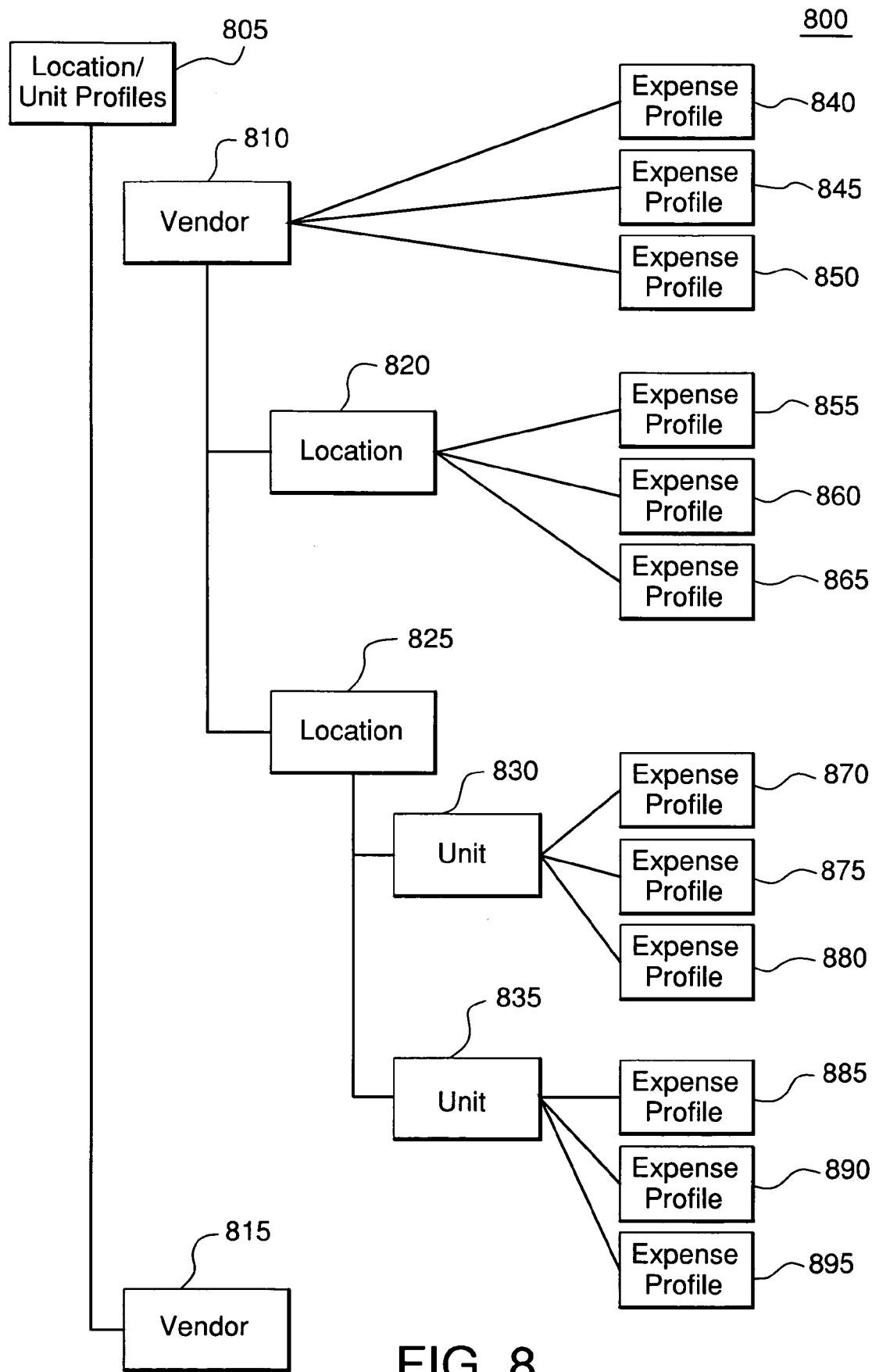
FIG. 8 is a block diagram showing exemplary associations between a location/unit profile and expense profiles of an illustrative operation in accordance with the herein described methods.

8. As shown in FIG. 8, expense profiles 840, 845, and 850 may be associated with vendor 810; while expense profiles 855, 860 and 865 may be associated with location 820. At the same time, expense profiles 870, 875 and 880 may be associated with unit 830; and expense profiles 885, 890 and 895 may be associated with unit 835.

Figure 9:
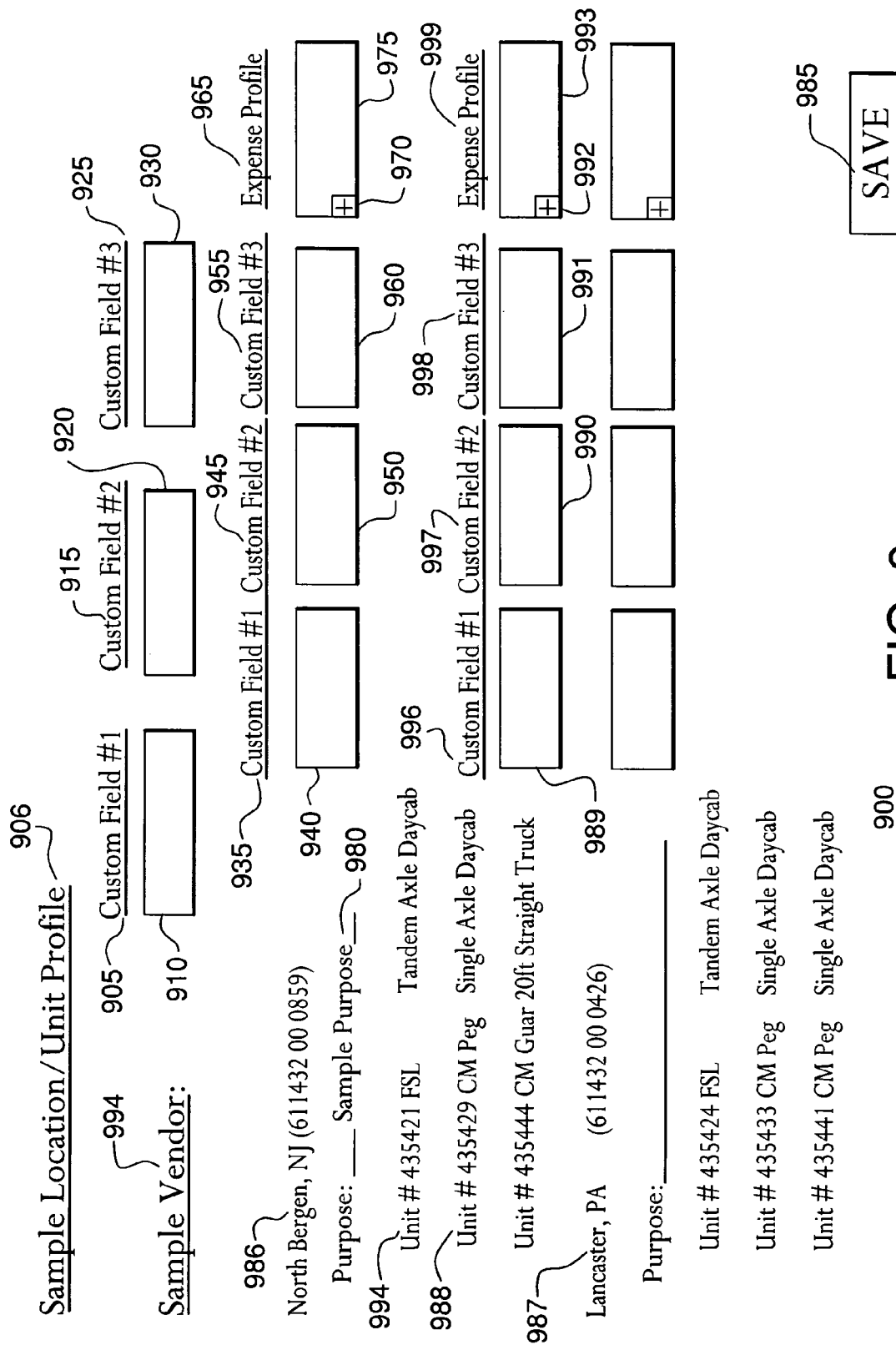
FIG. 9 is an exemplary screen for creating a location/unit profile of an illustrative operation in accordance with the herein described methods.

An exemplary location/unit profile and custom field associations may be further illustrated by the screen shot in FIG. 9. FIG. 9 shows an exemplary screen where the user may create a new location/unit profile. As shown in FIG. 9, the name of the location/unit profile is shown in block 906, where the user may provide a custom name for the particular profile. The name of the vendor is shown in block 994, where the user may provide a name for the particular vendor. Custom field #1 905, custom field #2 915, and custom field #3 925 may be associated with vendor 994 and the user may freely define the name of the custom fields. In addition, the user may associate custom field values 910, 920 and 930 with custom fields 905, 915 and 925 respectively. In this example, beneath the vendor level, there are two locations 986 and 987. The user may freely define and customize the text of the defined location 986 and 987. The user may also define certain purposes for a particular location in block 980. Similar to the vendor level, custom fields and custom field values may be associated with each location. As shown in FIG. 9, custom fields 935, 934 and 955 and their respective custom field values 940, 950 and 960 may be associated with location 986. The user may freely define and rename the custom fields 935, 934 and 955. In addition, a selection of expense profiles may be available through the functionality of 970. For example, a user may click on the button 970 to view a list of existing expense profiles. From the view, the user may select an existing expense profile to be associated with the particular vendor, location or unit. As illustrated by FIG. 9, the user may select an expense profile to be associated with location 986, and the selected expense profile may be displayed in block 975.

As further illustrated by FIG. 9, a location 986 may contain multiple units 994, 988 and 995. Similar to the location level, custom fields 996, 997, and 998 and their respective custom field values 989, 990 and 991 may be associated with unit 995. The user may freely define and rename the custom fields 996, 997 and 998. In addition, a selection of expense profiles may be available through the functionality of 992. For example, a user may click on the button 992 to view a list of existing expense profiles. From the view, the user may select an existing expense profile to be associated with the unit 995, and the selected expense profile may be displayed in block 993. After the user has completed the creation of the location/unit profile, the user may use the "Save" feature 985 to store the location/unit profile. Invoices may now be generated using the stored location/unit profile.

Figure 10:
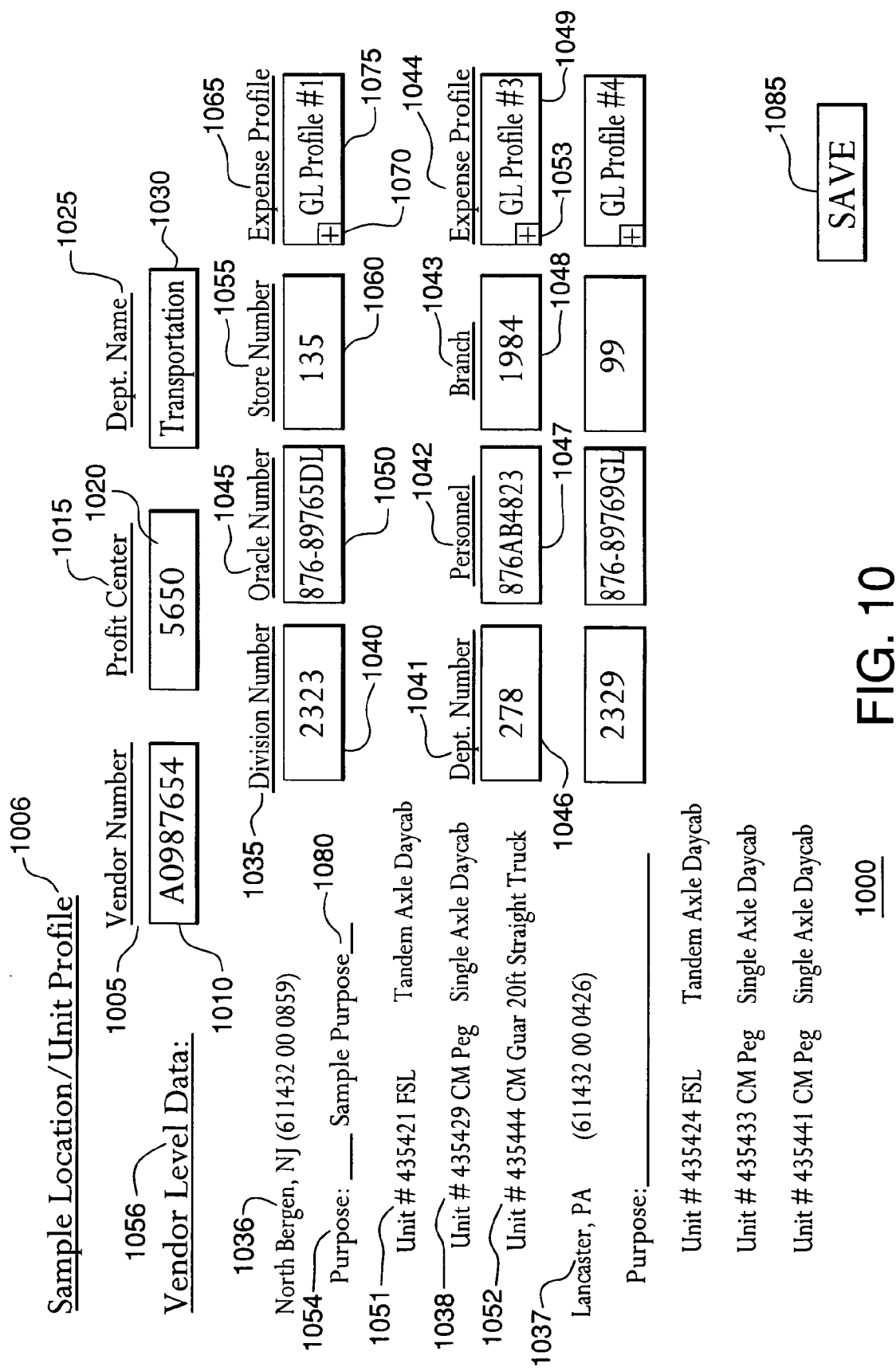
FIG. 10 is an exemplary screen for editing a location/unit profile of an illustrative operation in accordance with the herein described methods.

An exemplary location/unit profile and custom field associations may be further illustrated by the screen shot in FIG. 10. FIG. 10 shows an exemplary screen where the user may edit an existing location/unit profile. As shown in FIG. 10, the name of the existing location/unit profile is shown in block 1006, where the user may edit or change the name for the existing location/unit profile. The name of the vendor is shown in block 1056, where the user may edit or change the name for the particular vendor. Similarly, the purpose of a location is shown in block 1080, where the user may edit or change the purpose of a location. In this example, the user may edit, change, delete or add any custom fields and custom field values to the location/unit profile at any of the vendor, location and unit levels. As illustrated in FIG. 10, at the vendor level, the user may edit, change, or delete the custom fields 1005, 1015, 1025 and their corresponding custom field values 1010, 1020, and 1030. The user may also add more custom fields and corresponding custom field values at the vendor level. In addition, the user may associate expense profiles to a particular vendor. Similarly, at the location level, the user may edit, change, or delete the custom fields 1035, 1045, 1055 and their corresponding custom field values 1040, 1050, and 1060. The user may also add more custom fields and corresponding custom field values at the location level. In addition, the user may edit, change, add or delete associations of one or more expense profiles at block 1075 through the selection functionality of 1070. For example, a user may click on the button 1070 to view a list of existing expense profiles. From the view, the user may edit, change, add or delete one or more associations of expense profiles.

Similarly, at the unit level, the user may edit, change, or delete the custom fields 1041, 1042, 1043 and their corresponding custom field values 1046, 1047, and 1048. The user may also add more custom fields and corresponding custom field values at the unit level. Similar to the location level, the user may edit, change, add or delete associations of one or more expense profiles at block 1048 through the selection functionality of 1053. After the editing of the existing location/unit profile is completed, the user may use the "Save" functionality at block 1085 to update and store the location/unit profile. After the location/unit profile is updated, new invoices may be generated using the updated location/unit profile.

Figure 11:
FIG. 11 is an exemplary invoice using the custom cost accounting features of an illustrative operation in accordance with the herein described methods.

FIG. 11 shows a sample of an invoice generated using one or more expense profiles and/or one or more location/unit profiles. As shown in FIG. 11, information contained in the expense profiles and/or location/unit profiles are incorporated in the generated invoice. For example, custom fields "Vendor Number" 1105, "Profit Center" 1110, "Department Name" 1115 and their corresponding custom field values "A0987654" 1180, "5650" 1185, and "Transportation" 1190 are previously defined at the vendor level and stored in a location/unit profile. Similarly, custom fields "Division Number" 1120, "Oracle Number" 1130, "Store Number" 1055 and their corresponding custom field values "2323" 1125, "876-89765DL" 1135, and "135" 1145 are previously defined at the location level and stored in the location/unit profile. The information under "Charge Type" 1150, and "GL Number" 1160, such as "CM Peg" 1155 and "1112" 1165 are previously defined and stored in an expense profile. As discussed in detail, the previously stored expense profiles may then be associated with a location/unit profile at any of the vendor, location and unit levels.

The user may be provided with a selection to choose the desired information within an expense profile and/or a location/unit profile to be displayed in an invoice. For example, referring to FIG. 11, the user may select custom field and custom field values at the vendor and location level to be displayed with an invoice, but may select not to display any custom field and custom field values at the unit level. Furthermore, a user may select certain custom field and/or custom field values within a particular level to be displayed in an invoice. This feature can improve the efficiency of the cost accounting invoicing system by greatly increasing the flexibility for the user to define an invoice in a way that would best accommodate the customer's needs.

Figure 12:
FIG. 12 is an exemplary screen for editing and displaying individual invoice using the custom cost accounting features of an illustrative operation in accordance with the herein described methods.

FIG. 12 shows another sample of an invoice generated using one or more expense profiles and/or one or more location/unit profiles. As shown in FIG. 12, an invoice may be displayed in summary format and information from location/unit profiles and/or expense profiles may be provided through functionalities of buttons 1205, 1210, 1215 and 1220. If the user would like a more detail invoice, which incorporates information from the location/unit profiles and/or expense profiles, the user may choose to view a more detail invoice by clicking on buttons 1205, 1210, 1215 or 1220. In addition to viewing a more detail invoice, through the functionalities of 1205, 1210, 1215 and 1220, the user may choose to edit such information for the particular invoice. The newly edited information would be given priority and would override the information contained in the invoice originally generated by utilizing the existing expense profiles and/or location/unit profiles. This functionality allows the user to make ad hoc and/or occasional changes to an invoice without updating and/or creating new expense profiles and/or location/unit profiles.

It is understood that the herein described systems and methods are susceptible to various modifications and alternative constructions. There is no intention to limit the invention to the specific constructions described herein. To the contrary, the invention is intended to cover all modifications, alternative constructions, and equivalents falling within the scope and spirit of the invention.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

What is claimed is:

1. A method of custom cost accounting invoicing, comprising:
    providing a first interface for a plurality of customers to create, via the first interface, at least one expense profile for each customer, wherein each expense profile comprises a plurality of expense items;
    allocating, using a microprocessor, at least one expense account to at least one expense item in the expense profile;
    storing the expense profile on a database;
    providing a second interface for the plurality of customers to create, via the second interface, at least one custom profile for each customer, wherein each custom profile comprises a plurality of custom items defined by each customer;
    allocating, using a microprocessor, at least one expense profile to at least one custom profile;
    storing the custom profile on a database; and
    generating an invoice comprising a plurality of custom items in the custom profile, a plurality of expense items in the expense profile allocated to the custom profile, and at least one expense account allocated to at least one expense item stored in the expense profile and the custom profile.

2. The method as recited in claim 1, wherein the interface is an internet interface.

3. The method as recited in claim 1, wherein:
    the expense profile further comprises one or more expense items at one or more expense levels.

4. The method as recited in claim 3, further comprising:
    allocating at least one expense account to one or more items at one or more expense levels.

5. The method as recited in claim 4, further comprising:
    prioritizing expense account allocations from the lowest expense level.

6. The method as recited in claim 1, further comprising:
    defining custom items in the custom profile at one or more customer account levels.

7. The method as recited in claim 6, further comprising:
    allocating one or more expense profiles to the custom profile at one or more customer account levels.

8. The method as recited in claim 1, further comprising:
    displaying the generated invoice.

9. The method as recited in claim 1, further comprising:
    providing an interface to edit information on the invoice; and
    generating a new invoice using the edited information.

10. A computer readable storage medium with instructions stored thereon, wherein the instructions instruct a microprocessor to perform the following:
    providing a first interface for a plurality of customers to create at least one expense profile for each customer, wherein each expense profile comprises a plurality of expense items;
    allocating at least one expense account to at least one expense item in the expense profile;
    storing the expense profile on a database;
    providing a second interface for the customers to create at least one custom profile for each customer, wherein each custom profile comprises a plurality of custom items defined by the customer;
    allocating at least one expense profile to at least one custom profile;
    storing the custom profile on a database; and
    generating an invoice comprising a plurality of custom items in the custom profile, a plurality of expense items in the expense profile allocated to the custom profile, and at least one expense account allocated to at least one expense item stored in the expense profile and the custom profile.

11. A computer system for custom cost accounting invoicing comprising:
    an input interface coupled to a processor, wherein the processor is configured to receive input from the in put interface to:
    create at least one expense profile for each of a plurality of customers, wherein each expense profile comprises a plurality of expense items;
    allocate at least one expense account to at least one expense item in the expense profile;
    create at least one custom profile for each customer, wherein each custom profile comprises a plurality of custom items defined by the customer;
    allocate at least one expense profile to at least one custom profile;
    memory coupled to the processor, wherein the processor is configured to store the expense profile and custom profile in said memory; and
    wherein said processor is configured to generate an invoice comprising a plurality of custom items in the custom profile, a plurality of expense items in the expense profile allocated to the custom profile, and at least one expense account allocated to at least one expense item stored in the expense profile and the custom profile.

12. The computer system as recited in claim 11, wherein the expense profile and custom profile are stored on a database.

13. The computer system as recited in claim 11, wherein:
    the input interface comprises at least one internet page.

14. The computer system as recited in claim 11, wherein:
    the expense profile further comprises one or more expense items at one or more expense levels.

15. The computer system as recited in claim 14, wherein said processor coupled to said input interface is configured to receive input from the input interface to allocate one or more expense items at one or more expense levels to at least one expense account.

16. The computer system as recited in claim 15, wherein: the processor prioritizes expense account allocations from the lowest expense level.

17. The computer system as recited in claim 11, wherein said processor coupled to said input interface is configured to receive input from the input interface to define one or more custom items in the custom profile at one or more customer account levels.

18. The computer system as recited in claim 17, wherein said processor is configured to allocate one or more expense profiles to the custom profile at one or more customer account levels.

19. The computer system as recited in claim 11, further comprising:
an output interface coupled to the processor, wherein the processor is configured to display the generated invoice on said output interface.

20. The computer system as recited in claim 11, wherein said processor coupled to said input interface is configured to receive input from the input interface to edit information on the generated invoice; wherein the processor generates a new invoice based on the edited information.

* * * * *